United States Patent [19]

Shimada et al.

[11] Patent Number: 4,848,506
[45] Date of Patent: Jul. 18, 1989

[54] DRIVE POWER TRANSMISSION DEVICE

[75] Inventors: Kazuhiko Shimada; Tetsurou Hamada; Katsuhiko Masuda; Kazunori Shibuya, all of Saitama, Japan

[73] Assignee: Honda Giken Kogyo Kabushiki Kaisha, Tokyo, Japan

[21] Appl. No.: 67,922

[22] Filed: Jun. 26, 1987

[30] Foreign Application Priority Data

Jun. 30, 1986 [JP] Japan .................................. 61-153577

[51] Int. Cl.⁴ ............................................ B60K 17/35
[52] U.S. Cl. ...................................... 180/248; 180/249; 192/48.3; 192/57; 192/58 B; 192/105 B
[58] Field of Search ............... 180/248, 249; 192/48.3, 192/57, 58 B, 105 B, 48.5, 48.7; 74/711

[56] References Cited

U.S. PATENT DOCUMENTS

| | | | |
|---|---|---|---|
| 3,858,697 | 1/1975 | Brewer et al. | 192/57 X |
| 3,924,716 | 12/1975 | Brewer | 192/57 |
| 3,939,734 | 2/1976 | Blanchette et al. | 192/105 B X |
| 4,022,084 | 5/1977 | Pagdin | 74/711 |
| 4,031,780 | 6/1977 | Dolan et al. | 180/249 X |
| 4,037,692 | 8/1977 | McFarland | 192/57 X |
| 4,058,027 | 11/1977 | Webb | 192/57 X |
| 4,384,862 | 5/1983 | Nakane | 192/105 B X |
| 4,605,087 | 8/1986 | Ashauer et al. | 180/248 |
| 4,723,624 | 2/1988 | Kawasaki et al. | 192/48.3 X |

FOREIGN PATENT DOCUMENTS

| | | |
|---|---|---|
| 1625666 | 2/1972 | Fed. Rep. of Germany . |
| 2245901 | 4/1974 | Fed. Rep. of Germany . |
| 3430465 | 5/1986 | Fed. Rep. of Germany . |
| WO86/02133 | 4/1986 | PCT Int'l Appl. . |
| 718263 | 11/1954 | United Kingdom . |
| 871131 | 6/1961 | United Kingdom . |
| 930851 | 8/1963 | United Kingdom . |
| 1032542 | 6/1966 | United Kingdom . |
| 1528022 | 10/1978 | United Kingdom . |
| 2161872 | 1/1986 | United Kingdom . |

*Primary Examiner*—Charles A. Marmor
*Attorney, Agent, or Firm*—Lyon & Lyon

[57] ABSTRACT

A drive power transmission device includes: a first shaft for receiving drive power transmitted from a drive source; a second shaft having a coupling shaft portion at a front end thereof; a coupling housing comprising a cover body having a front portion operatively coupled to a rear end of the first shaft and a rear portion including a central bearing portion in which a distal end of the coupling shaft portion is rotatably supported, and a tubular member having a front open end in which an outer circumference of the cover body is fitted and a rear boss end having a central through hole in which a proximal portion of the coupling shaft portion is rotatably supported, the cover body, the boss end, the coupling shaft portion, and the tubular member jointly defining a cylindrical fluid chamber filled with a fluid; a viscous shear coupling mechanism disposed in the fluid chamber for transmitting the drive power from the first shaft through the fluid to the second shaft; and a centrifugal clutch mechanism disposed between the coupling housing and the second shaft for transmitting the drive power from the first shaft to the second shaft.

10 Claims, 1 Drawing Sheet

DRIVE POWER TRANSMISSION DEVICE

BACKGROUND OF THE INVENTION

1. Field of the Invention

The present invention relates to a drive power transmission device for use in a motor vehicle, and more particularly to a drive power transmission device employing a viscous shear coupling.

2. Description of the Relevant Art

Viscous shear couplings are employed as the central differentials, for example, of four-wheel drive motor vehicles.

For example, a viscous shear coupling disclosed in U.S. Pat. No. 4,022,084 comprises coaxial input and output shafts, an enclosure disposed between the input and output shafts, and first and second groups of mutually interleaved plates housed in the enclosure and coupled respectively to the input and output shafts. The enclosure is filled with highly viscous silicone oil.

Where the disclosed viscous shear coupling is employed in the central differential of a four-wheel drive motor vehicle, it can eliminate the problem of tight turn braking which would otherwise be caused by the difference between the angular speeds of front and rear wheels as upon steering the motor vehicle at low speed into a garage or a parking space. During travel at high speed, however, the viscous shear coupling suffers a lower efficiency of torque transmission than a direct shaft coupling since the drive force is transmitted through the silicone oil at all times.

SUMMARY OF THE INVENTION

The present invention has been made in an effort to overcome the above drawback.

It is an object of the present invention to provide a driver power transmission device which is adapted to be disposed between input and output shafts for transmitting driver power therebetween automatically selectively in a direct coupling mode or a viscous coupling mode dependent on the speed of rotation of one of the shafts.

According to the present invention, there is provided a drive power transmission device comprising: a first shaft for receiving drive power transmitted from a drive source; a second shaft having a coupling shaft portion at a front end thereof; a coupling housing comprising a cover body having a front portion operatively coupled to a rear end of the first shaft and a rear portion including a central bearing portion in which a distal end of the coupling shaft portion is rotatably supported, and a tubular member having a front open end in which an outer circumference of the cover body is fitted and a rear boss end having a central through hole in which a proximal portion of the coupling shaft portion is rotatably supported, the cover body, the boss end, the coupling shaft portion, and the tubular member jointly defining a cylindrical fluid chamber filled with a fluid; a viscous shear coupling mechanism disposed in the fluid chamber for transmitting the drive power from the first shaft through the fluid to the second shaft; and a centrifugal clutch mechanism disposed between the coupling housing and the second shaft for transmitting the drive power from the first shaft to the second shaft.

The viscous shear coupling mechanism comprises a number of first axially spaced annular disks disposed around the coupling shaft portion in radially spaced relation thereto and fixed to an inner peripheral surface of the tubular member, and a number of second axially spaced annular disks fixed to the coupling shaft portion and radially spaced from the inner peripheral surface of the tubular member, the first and second annular disks being mutually interleaved.

Where the clutch mechanism is disposed between the viscous shear coupling mechanism and the cover body within the fluid chamber, the clutch mechanism comprises a clutch disk disposed in confronting relation to the cover body and axially slidably fitted over the coupling shaft portion, a pressure plate disposed in confronting relation to the clutch disk and axially slidably fitted in the tubular member, a weight holder disposed adjacent to the pressure plate and fitted in the tubular member, the weight holder having a plurality of slanted surfaces inclined progressively axially in a radially inward direction of the tubular member, and a plurality of roller-shaped centrifugal weights disposed in gaps between the pressure holder and the slanted surfaces of the weight holder and normally urged in the radially inward direction of the tubular member.

In case the drive power transmission device is incorporated in a four-wheel drive motor vehicle comprising a front differential, front wheels coupled to the front differential, a rear differential, rear wheels coupled to the rear differential, an engine as the drive source, a transmission operatively coupled between the engine and the front differential, and a propeller shaft having a front end coupled to the transmission and a rear end coupled to the rear differential, the propeller shaft is divided into the first shaft coupled to the transmission and the second shaft coupled to the rear differential, and is disposed between the first and second shafts and interconnects them.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
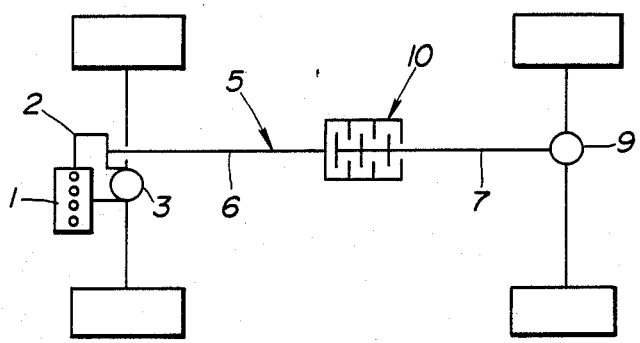
FIG. 1 is a schematic plan view of a drive system of a four-wheel drive motor vehicle incorporating a drive power transmission device according to an embodiment of the invention.

As shown in FIG. 1, a four-wheel drive motor vehicle has a drive system incorporating a drive power transmission device according to an embodiment of the present invention.

In the four-wheel drive motor vehicle shown in FIG. 1, drive power from an engine 1 is transmitted through a transmission 2 to a front differential 3 and a propeller shaft 5, the rotation of which is in turn transmitted to a rear differential 9. A power transmission device 10 is disposed on the propeller shaft 5. More specifically, the propeller shaft 5 is divided into a front input shaft 6 and a rear output shaft 7 which are coupled to each other through the power transmission device 10.

Figure 2:
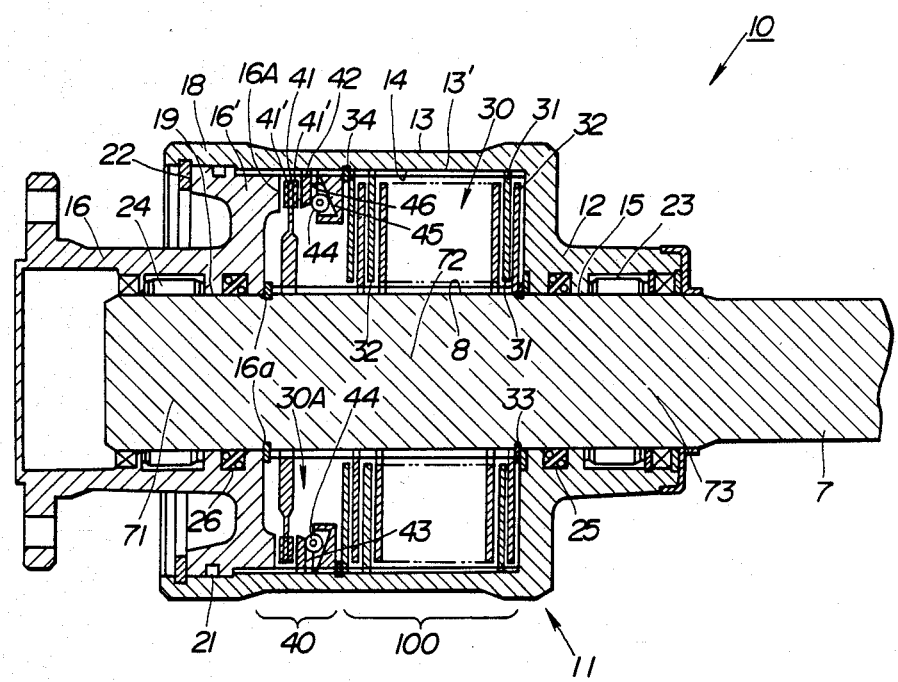
FIG. 2 is a cross-sectional view of the drive power transmission device of the present invention.

The power transmission device 10 will be described in detail with reference to FIG. 2.

The power transmission device 10 has an outer coupling housing 11 comprising a tubular member 13 including a front open end 18 having a circular opening and a rear boss end 12 in the form of a bearing supporting boss as a closure member, the rear end 12 having a central through hole 15, and a cover body 16 having a front portion to which the rear end (not shown) of the input shaft 6 is connected and a rear portion having a central through bearing hole 19.

The rear portion of the cover body 16 includes a circular flange 16' on its outer circumference. The circular flange 16' has its outer circumference fitted in and splined to the front end 18 of the tubular member 13. The circular flange 16' is fully sealed and secured in position by an O-ring 21 and a snap ring 22. The input shaft 6 and the cover body 16 may be interconnected either by directly coupling the rear end of the input shaft 6 and the front end of the cover body 16 coaxially with bolts or by indirectly coupling them through a gear box or the like. The cover body 16 is prevented from sliding into the tubular body 16 by means of a stop ring 16a secured to the output shaft 7.

The output shaft 7 includes a front coupling shaft portion 72 extending through the central hole 15 of the boss end 12 into the coupling housing 11 so that the output shaft 7 is held coaxially with the coupling housing 11. The front coupling shaft portion 72 has a distal end 71 rotatably supported in the central bearing hole 19 by means of a bearing 24 and an oil seal 26. The proximal end 73 of the front coupling shaft portion 72 is rotatably supported in the central hole 15 by means of a bearing 23 and an oil seal 25.

The coupling housing 11 has a cylindrical fluid chamber 30 defined by the inner peripheral surface 13' of the tubular member 13, the inner surface of the boss end 12, the rear end surface of the cover body 16, and the front coupling shaft portion 72 of the output shaft 7, the fluid chamber 30 being filled with a fluid such as silicone oil.

The inner peripheral surface 13' of the tubular member 13 has spline grooves 14 extending substantially the entire axial length thereof. A group of first annular disks 31 which are axially spaced are disposed in the fluid chamber 30 and around the coupling shaft portion 72 of the output shaft 7 in radially spaced relation thereto, the first annular disks 31 having their outer peripheries fixedly fitted in the spline grooves 14.

The outer periphery of the coupling shaft portion 72 which lies in the fluid chamber 30 has spline grooves 8 extending substantially the entire length thereof. A group of second annular disks 32 which are axially spaced are disposed in the fluid chamber 30 and radially spaced from the inner peripheral surface 13' of the tubular member 13, the second annular disks 32 having their inner peripheries fixedly fitted in the spline grooves 8.

The second and first annular disks 32, 31 are alternately disposed, i.e., mutually interleaved, and are kept mutually spaced by stop rings 33, 34 at small intervals or spacings. These annular disks 31, 32 jointly constitute a viscous shear coupling mechanism 100 disposed in the coupling housing 11.

An auxiliary fluid chamber 30A is defined axially between the first and second disk groups 31, 32 and the cover body 16, with a lock-up clutch mechanism 40 disposed in the auxiliary fluid chamber 30A.

The clutch mechanism 40 is a centrifugal clutch comprising a clutch disk 41, a pressure plate 42, a plurality of roller-shaped centrifugal weights 44, and a weight holder 45. The clutch disk 41 is axially slidably splined to the outer periphery of the coupling shaft portion 72 of the output shaft 7. The clutch disk 41 has its outer peripheral marginal edge reduced in thickness, and friction members 41' attached respectively to the opposite surfaces of the thinner marginal edge for frictional engagement with the pressure plate 42 and an outer annular clutch surface 16A on the inner end of the cover body 16.

The pressure plate 42 is axially slidably splined to the inner peripheral surface 13' of the tubular member 13 in opposite relation to the clutch surface 16A across the clutch disk 41. The weight holder 45 is also splined to the inner peripheral surface 13' of the tubular member 13 adjacent to the pressure plate 42. The weight holder 45 has a plurality of slanted surfaces 46 progressively inclined axially in a direction toward the coupling shaft portion 72. The pressure plate 42 has guide grooves 43 defined in its rear surface and opening respectively toward the slanted surfaces 46. The roller-shaped centrifugal weights 44 are positioned in gaps defined between the slanted surfaces 46 and the guide grooves 43. The roller-shaped centrifugal weights 44 are normally urged by return springs (not shown) to move toward the radially inner ends of the inclined surfaces 46, i.e., toward the coupling shaft portion 72. The pressure plate 42 may also be normally urged by a spring or the like (not shown) to move toward the slanted surfaces 46 of the weight holder 45.

The viscous shear coupling mechanism 100 and the centrifugal clutch mechanism 40 are disposed together as a lock-up viscous shear coupling within the coupling housing 11.

Operation of the drive power transmission 10 thus constructed is as follows:

When the speed at which the coupling housing 11 rotates with the input shaft 6 is lower than a prescribed speed level, the centrifugal weights 44 are biased radially inwardly along the slanted surfaces 46 under the forces of the return springs, and the pressure plate 42 remains out of frictional engagement with the clutch disk 41 which is thus held out of frictional engagement with the clutch surface 16A. Therefore, the clutch mechanism 40 is disengaged or disconnected. The drive power from the input shaft 6 is therefore transmitted successively through the coupling housing 11, the first annular disk group 31, the fluid, and the second annular disk group 32 to the output shaft 7. As a consequence, the drive power transmission device 10 functions as a central differential.

When the speed of rotation of the coupling housing 11 exceeds the prescribed speed level, the centrifugal weights 44 are displaced radially outwardly along the slanted surfaces 46 under centrifugal surfaces against the resilient forces of the return springs, thus pushing the pressure plate 42 axially into frictional engagement with the clutch disk 41. The clutch disk 41 is thus sandwiched between the pressure plate 42 and the clutch surface 16A, whereupon the clutch mechanism 40 is engaged or connected. The input shaft 6 and the output shaft 7 are directly connected to each other, so that the driver power from the engine 1 can directly be transmitted from the input shaft 6 to the output shaft 7.

In the illustrated embodiment, the clutch mechanism 40 is housed in the fluid chamber 30, i.e., the auxiliary fluid chamber 30A. However, the clutch mechanism 40 may be disposed outside of the coupling housing 11 and between the coupling housing 11 and the output shaft 7. The drive power transmission device 10 may be used in a reversed position, i.e., the driver power may be applied to the output shaft 7 and picked up from the input shaft 6.

With the present invention, when the motor vehicle runs at low speed, the clutch mechanism 40 remains inoperative, and the viscous shear coupling mechanism 100 is operated for thereby eliminating the phenomenon of tight turn braking which would otherwise be experienced by the four-wheel drive motor vehicle when making a small turn. During high-speed travel of the motor vehicle, the clutch mechanism 40 is connected to directly interconnect the input shaft 6 and the output shaft 7 for increased torque transmission efficiency. Since the viscous shear coupling mechanism 100 is not in operation at this time, it remains highly durable over a long period of time.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:
1. A drive power transmission device comprising:
a first shaft for receiving drive power transmitted from a drive source;
a second shaft having a coupling shaft portion at a front end thereof;
a coupling housing comprising a cover body having a front portion operatively coupled to a rear end of said first shaft and a rear portion including a central bearing portion in which a distal end of said coupling shaft portion is rotatably supported, and a tubular member having a front open end in which an outer circumference of said cover body is fitted and a rear boss end having a central through hole in which a proximal portion of said coupling shaft portion is rotatably supported, said cover body, said boss end, said coupling shaft portion, and said tubular member jointly defining a cylindrical fluid chamber filled with a fluid;
a viscous shear coupling mechanism disposed in said fluid chamber and having means connected to said first shaft and second shaft for transmitting the drive power from said first shaft through said fluid to said second shaft; and
a centrifugal clutch mechanism disposed between and having means connected to said coupling housing and said second shaft for transmitting the drive power from said first shaft to said second shaft separate from and in parallel relationship to the transmitting of drive power by said viscous shear coupling mechanism.

2. A drive power transmission mechanism according to claim 1, wherein said clutch mechanism is located between said viscous shear coupling mechanism and said cover body within said fluid chamber.

3. A drive power transmission mechanism according to claim 1, wherein said clutch mechanism comprises:
a clutch disk disposed in confronting relation to said cover body and axially slidably fitted over said coupling shaft portion;
a pressure plate disposed in confronting relation to said clutch disk and axially slidably fitted in said tubular member;
a weight holder disposed adjacent to said pressure plate and fitted in said tubular member, said weight holder having a plurality of slanted surfaces inclined progressively axially in a radially inward direction of said tubular member; and
a plurality of roller-shaped centrifugal weights disposed in gaps between said pressure holder and said slanted surfaces of said weight holder and normally urged in the radially inward direction of said tubular member.

4. A four-wheel drive motor vehicle comprising:
a front differential;
front wheels coupled to said front differential;
a rear differential;
rear wheels coupled to said rear differential;
a transmission operatively coupled between an engine and said front differential;
said drive power transmission device according to claim 3;
said engine as said drive source; and
a propeller shaft comprising said first shaft connected to said transmission and said second shaft connected to said rear differential, said first and second shafts being interconnected by said drive power transmission device.

5. A drive power transmission device according to claim 1, wherein said viscous shear coupling mechanism comprises:
a number of first axially spaced annular disks disposed around said coupling shaft portion in radially spaced relation thereto and fixed to an inner peripheral surface of said tubular member; and
a number of second axially spaced annular disks fixed to said coupling shaft portion and radially spaced from said inner peripheral surface of said tubular member, said first and second annular disks being mutually interleaved.

6. A drive power transmission device according to claim 1 wherein, said centrifugal clutch mechanism includes means for transmitting an increased amount of drive power from the first shaft to the second shaft as the drive power increases.

7. A drive power transmission device comprising:
a first shaft for receiving drive power transmitted from a drive source;
a second shaft having a coupling shaft portion at a front end thereof;
a coupling housing comprising a cover body having a front portion operatively coupled to a rear end of said first shaft and a rear portion including a central bearing portion in which a distal end of said coupling shaft portion is rotatably supported, and a tubular member having a front open end in which an outer circumference of said cover body is fitted and a rear boss end having a central through hole in which a proximal portion of said coupling shaft is rotatably supported, said cover body, said boss end, said coupling shaft portion, and said tubular member jointly defining a cylindrical fluid chamber filled with a fluid;
a centrifugal clutch mechanism disposed between and having means connected to said coupling housing and said second shaft for transmitting the drive power from said first shaft to said second shaft;
a viscous shear coupling mechanism disposed in said fluid chamber and having means connected between said tubular member and said second shaft for transmitting the drive power from said first shaft through said fluid to said second shaft; and wherein said viscous shear coupling mechanism comprises:

a number of first axially spaced annular disks disposed around said coupling shaft portion in radially spaced relation thereto and fixed to an inner peripheral surface of said tubular member; and a number of second axially spaced annular disks fixed to said coupling shaft portion and radially spaced from said inner peripheral surface of said tubular member, said first and second annular disks being mutually interleaved.

8. A drive power transmission mechanism according to claim 7, wherein said clutch mechanism comprises:

a clutch disk disposed in confronting relation to said cover body and axially slidably fitted over said coupling shaft portion;

a pressure plate disposed in confronting relation to said clutch disk and axially slidably fitted in said tubular member;

a weight holder disposed adjacent to said pressure plate and fitted in said tubular member, said weight holder having a plurality of slanted surfaces inclined progressively axially in a radially inward direction of said tubular member; and a plurality of roller-shaped centrifugal weights disposed in gaps between said pressure holder and said slanted surfaces of said weight holder and normally urged in the radially inward direction of said tubular member.

9. A four-wheel drive motor vehicle comprising:

a front differential;

front wheels coupled to said front differential;

a rear differential;

rear wheels coupled to said rear differential;

a transmission operatively coupled between an engine and said front differential;

said drive power transmission device according to claim 8;

said engine as said drive source; and a propeller shaft comprising said first shaft connected to said transmission and said second shaft connected to said rear differential, said first and second shafts being interconnected by said drive power transmission device.

10. A drive power transmission device according to claim 7 wherein, said centrifugal clutch mechanism includes means for transmitting an increased amount of drive power from the first shaft to the second shaft as the drive power increases.

* * * * *